Nov. 15, 1949 — F. S. ARMSTRONG — 2,488,259

ELECTRICAL REMOTE POSITION CONTROL APPARATUS

Filed Dec. 18, 1948 — 3 Sheets-Sheet 1

INVENTOR.
Frederick S. Armstrong
BY Albert G. McCaleb
Att'y

Nov. 15, 1949  F. S. ARMSTRONG  2,488,259
ELECTRICAL REMOTE POSITION CONTROL APPARATUS
Filed Dec. 18, 1948  3 Sheets-Sheet 2

INVENTOR.
Frederick S. Armstrong
BY
Albert G. McCaleb
Att'y

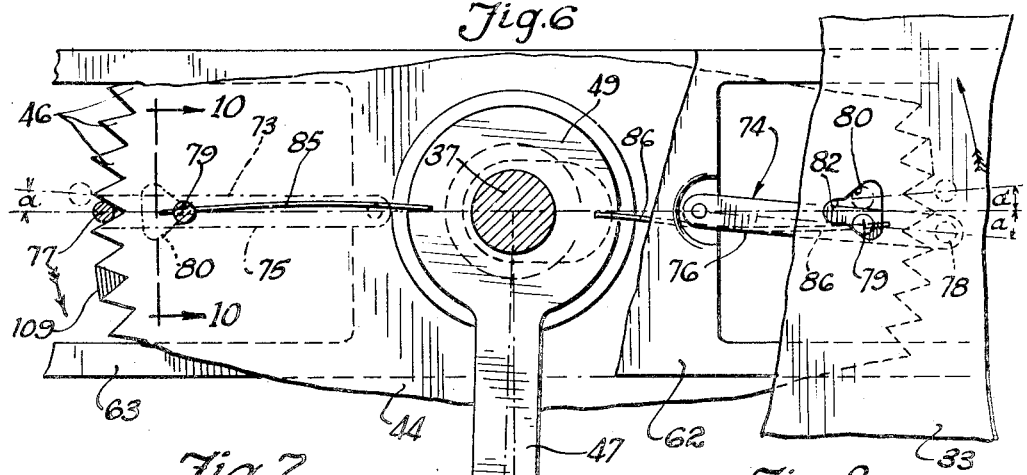
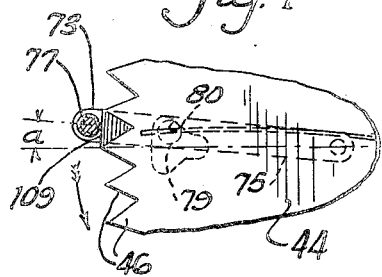
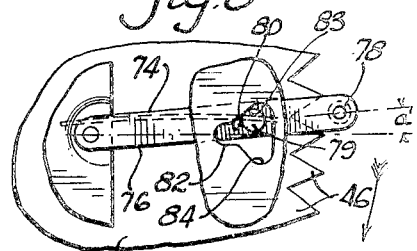
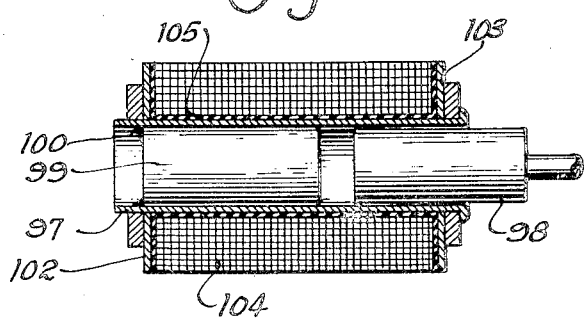
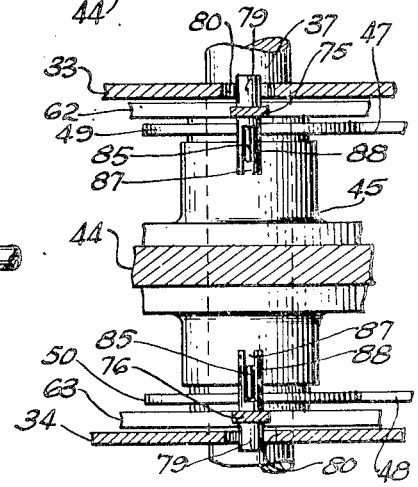
INVENTOR.
Frederick S. Armstrong
BY Albert G. McCaleb
Att'y Patented Nov. 15, 1949

2,488,259

UNITED STATES PATENT OFFICE 2,488,259

ELECTRICAL REMOTE POSITION CONTROL APPARATUS

Frederick S. Armstrong, Oak Park, Ill.

Application December 18, 1948, Serial No. 66,002

14 Claims. (Cl. 318—21)

1

This invention relates to remote control apparatus, and has particular reference to apparatus by which the position of an element may be selected and controlled rotationally within close increments of movement and by electrically effected actuation from a position remote from the element.

One of the objects of my invention is to provide apparatus of the type referred to in which the increments of rotational movement, in addition to being small, are effected step-by-step in either direction by easily accomplished manual switch operation.

As another object, the invention comprehends effective and normal locking of the remotely controlled element in each and all of the positions to which its movement is remotely effected; said holding being accomplished without the continued use of electrical energy.

This invention further has within its purview the provision of electrically actuated remote control apparatus which is operable at low voltage, so as to avoid the necessity of utilizing conduits, armored cable or the like to protect the wiring or meet safety requirements.

My invention has for another object the provision of remote control apparatus adapted through electrically actuated means to turn a driven element through substantially 180 degrees without the use of collector rings or the like in the electrical apparatus.

A further object of my invention is to provide remote control apparatus wherein rotational movement of an element is remotely effected and also wherein the movements of the element are reversible at will and from any position intermediate the extreme limits of such movements.

It is a further feature of my apparatus that definite end stop and fixed increments of movements from those stops may be provided, so that calibrated positions of the remotely controlled element may be established and repeatedly selected by counting increments from the end stop positions.

In an adaptation to the remote control of the position of a directional television antenna, the remotely controlled portion of my apparatus provides a base upon which the antenna is supported.

Other objects and advantages of the invention will be apparent from the following description and the accompanying drawings in which similar characters of reference indicate similar parts throughout the several views.

Referring to the three sheets of drawings,

Fig. 1 is a diagrammatic side elevational view

2 depicting generally the adaptation of my remote control apparatus to the positioning of a directional antenna for a television receiver from a location at which the received image may be observed;

Fig. 6 is a fragmentary top plan view of a portion of the apparatus shown in Fig. 4 and wherein those parts are drawn to a somewhat larger scale than in Fig. 4;

Figs. 7 and 8 are fragmentary views of certain portions of the parts shown in Fig. 6 and wherein different operating positions of the parts are depicted;

Fig. 9 is a side sectional view illustrating a structure of a preferred type of solenoid utilized in the apparatus depicted in Figs. 4 and 5; and Fig. 10 is a fragmentary sectional view wherein the section is taken substantially on a line 10—10 of Fig. 6 and in the direction indicated by the accompanying arrows.

Considered generally, the exemplary embodiment of my remote control apparatus which is depicted herein provides for the control, from a remotely located position, and by simply executed switch operations, of the rotational position of a rotor and driven shaft in a manner such that the rotor is normally locked in the position to which it is adjusted. While such remote control and selection of the position of an element through the use of electrical apparatus are not limited to an application for controlling the position of a directional antenna, that adaptation of the apparatus is disclosed herein as being illustrative of one practical application of the control apparatus.

Figure 1:
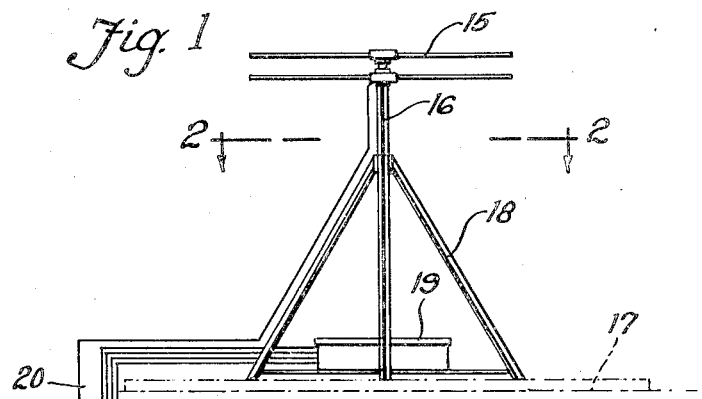
Figure 2:
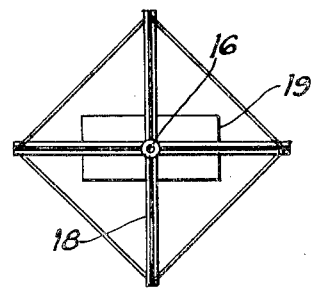
Fig. 2 is a top sectional view of a portion of the apparatus depicted in Fig. 1 and wherein the section is taken substantially on a line 2—2 of Fig. 1.

As illustrated in Fig. 1, in the adaptation to the control of the position of a directional television antenna, such an antenna 15 is supported at the top of a shaft 16, which shaft is supported for rotation relative to a building roof 17 or the like by a suitable structure, such as a tripod 18, the lower end of the shaft 18 being supported by an electrically actuated control unit 19. In the customary manner, a lead-in wire 20 extends from the antenna to a television receiver 22. At a position near the television receiver, and from which the television screen is visible to an operator, a second control unit 23 is placed for the remote actuation of the control unit 19 which positions the antenna for the best reception of the image. With the disclosed apparatus, and as will be more fully described, the second control unit 23 embodies manually operable switches 24 and 25, by the movements of which the actuation of the control unit 19 is effected. Power for actuation is supplied through the control unit 23 by supply line leads 26 and 27 from a power source and connected to that control unit. The two control units are electrically connected through a plurality of lead wires 28, 29, 30 and 32. It is my preference that the disclosed remote control apparatus shall be operable at a voltage between the lead wires 28, 29, 30 and 32 which is below that required by building codes and safety considerations to be encased in conduit, whereby the complication and expense of installation is minimized.

Figure 4:
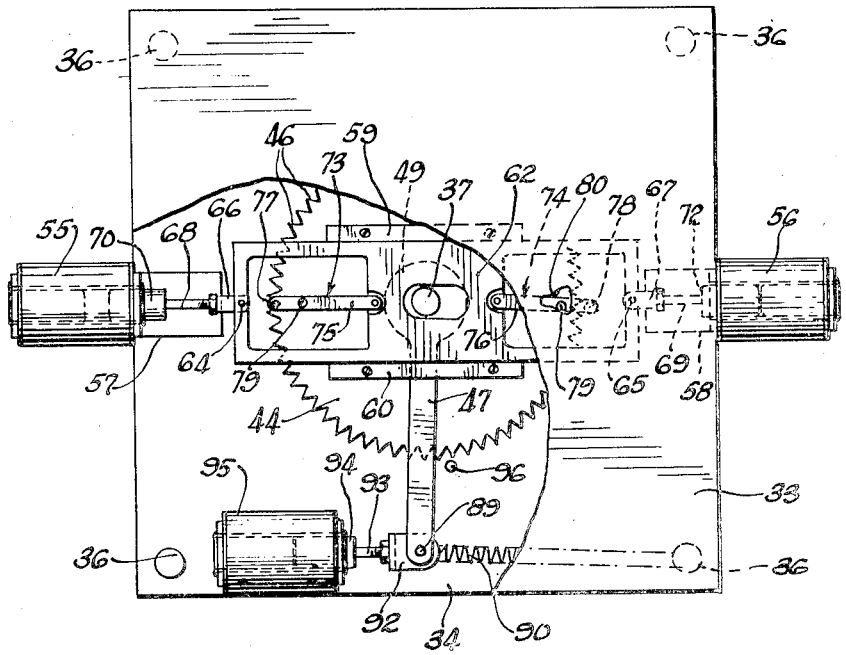
Figs. 4 and 5 are respectively top plan and front elevational views of a preferred form of control device utilized in the apparatus depicted in Figs. 1 and 3, and in which views certain portions of the outer structure are cut-away to show internal parts.
Figure 5:
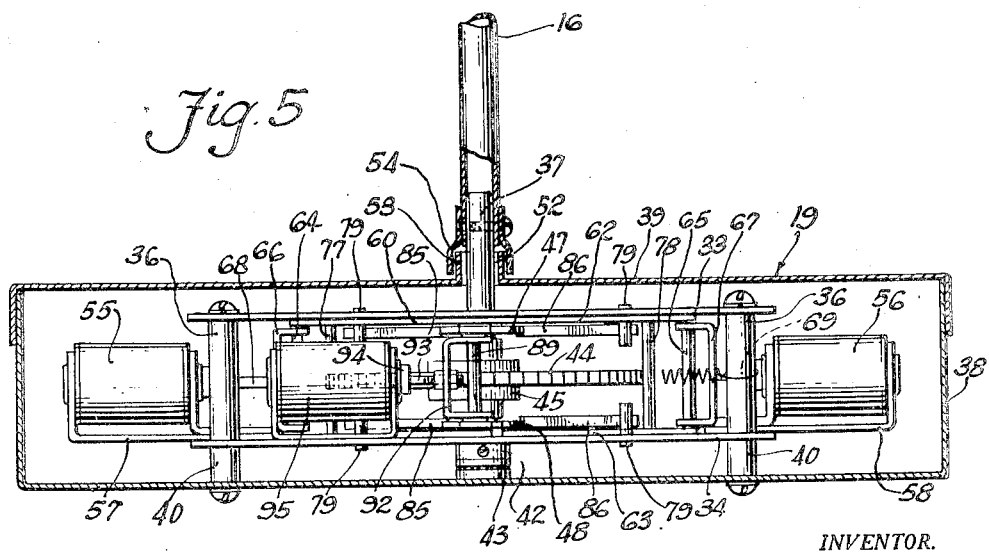

Referring in more detail to the preferred structure of my remote control apparatus, as depicted in the accompanying drawings, and particularly to the electrically actuated operating structure embodied in the control unit 19 and illustrated in Figs. 4 to 10 inclusive, this apparatus includes substantially parallel support plates 33 and 34 secured together in spaced and opposed relationship by corner posts 36. At the mid-portions of the plates 33 and 34, a shaft 37 is journalled for rotational movement and has an axis disposed in substantially perpendicular relationship to the support plate surfaces. In the disclosed structure, and as depicted in Fig. 5, the operating mechanism of the control unit 19 is enclosed in a metal box 38 having a cover 39 and providing a weatherproof housing for the unit. Also and by preference in this disclosed structure, the support plate 34 is secured to the bottom of the box and supported in spaced relationship thereto by posts 40. Furthermore, a collar 42 is secured to the lower end of the shaft externally of the plate 34, and a thrust bearing 43 is mounted on the shaft and interposed between the collar 42 and the bottom of the box to provide additional support for the shaft and the weight carried thereby. Between the support plates 33 and 34, a gear type rotor 44 is carried by a hub 45 and drivingly connected to the shaft 37; the rotor preferably being a disk-like structure having teeth 46 projecting radially from its outer periphery on opposite sides of the hub 45. As illustrated in Figs. 4, 5 and 10, projecting levers 47 and 48 have enlarged end portions 49 and 50 respectively rotatably mounted on the shaft 37 adjacent the opposite ends of the hub 45. As shown in Fig. 5, the shaft 16 is secured to a projecting end of the shaft 37, externally of the cover 39. Also a bearing 52 carried by an external projecting flange 53 on the cover 39 is overlapped by a flanged collar 54 secured to the shaft further to effect the provision of a weatherproof container.

As has been mentioned, the rotor 44 and consequently the shaft 37 of the control unit 19 are electrically actuated to effect step-by-step rotation in small and sequential increments, and are normally locked between those increments of movement. For effecting such operation, I have provided a mechanism which is carried by the support plates 33 and 34 and actuated by oppositely disposed solenoids 55 and 56, which solenoids are supported relative to the plate 34 by means such as brackets 57 and 58 respectively.

The operating parts of the rotor driving mechanism include pairs of guide strips such as 59 and 60 secured to the inner surfaces of the support plates 33 and 34 in parallel relationship on opposite sides of the shaft 37; the pairs of guide strips on the two support plates being in aligned and opposed relationship. Upper and lower slides 62 and 63 are mounted for linear sliding movement between the opposed pairs of guide strips 59 and 60. At their opposite ends, the slides 62 and 63 are secured together in spaced relationship by posts 64 and 65, which posts have yokes 66 and 67 respectively mounted thereon through which yokes and connecting shafts 68 and 69, secured thereto, the opposite ends of the slides 62 and 63 are drivingly connected to movable armatures 70 and 72 of the solenoids 55 and 56 respectively.

On opposite sides of the shaft 37, and substantially mid-way between the guides 59 and 60, as well as aligned with the direction of slide movement between the guides, the slides carry similar and oppositely disposed rotor driving and locking parts generally designated by reference numerals 73 and 74. Each of such parts includes a pair of substantially parallel arms 75 and 76 having their inner ends supported near the rotor shaft 37 by the slides 62 and 63 and for swinging movement about an axis parallel to the rotor axis. Between the ends of those arms 75 and 76 remote from the rotor shaft and at positions adjacent the periphery of the rotor, connecting pins 77 and 78 are secured to and extend between the movable ends of the arms to serve as motion translating parts or rotor pusher elements. In the disclosed structure, the spacing of the pins 77 and 78 on the rotor driving parts 73 and 74 is such that one of those pins clears the rotor teeth on one side of the rotor when the other pin is bottomed between adjacent teeth on a substantially diametrically opposed side of the rotor. Thus, when the slides 62 and 63 are moved back and forth by operation of the solenoids 55 and 56, one of the pusher elements is brought into engagement with a tooth on one side of the rotor while the other is moved to a position in which it clears the rotor teeth.

Each of the arms 75 and 76 has secured thereto at a position intermediate its ends and projecting outwardly therefrom a stud 79. These studs project into substantially pear shaped cam slots 80 in the support plates 33 and 34, which cam slots are aligned diametrically of the rotor and parallel to the direction of movement of the slides. Also, in my preferred structure, each of the cam slots 80 is shaped with substantial symmetry in respect to a plane passing through a diameter and the axis of the rotor. At the ends thereof nearest the rotor axis, each of the cam slots has a narrow portion 82 of a width and size to receive and quite snugly fit the stud 79, thereby to determine the positions of the arms 75 and 76 and thus lock the rotor when the studs of that pair of arms and the adjacent connecting pin 78 are held by the cam slot and engaged in rotor teeth, respectively. Opposed cam surface portions 83 and 84 adjacent the narrow portion 82 diverge in symmetrical relationship with respect to a center line and in a direction away from the rotor axis, so that the cam slots reach a width such that swinging movement of the arms 75 and 76 to the extent that the studs engage opposite sides of the cam slots carry the connecting pins at the ends of those arms over substantially the width of a rotor tooth; such swinging movements of the arms being necessary to permit the arms at one side of the rotor to follow the rotor movement while engagement between the connecting pin or pusher element on the other side of the rotor effects such rotor movement by engagement with a rotor tooth during movement of the slide which moves the latter pusher element inwardly of the tooth.

With the disposition of the described rotor driving and locking parts on diametrically opposite sides of the rotor, I utilize an odd number of teeth on the periphery of the rotor, so that the alternate movement of the respective pusher elements into engagement with teeth on the opposite sides of the rotor brings such teeth sequentially into successively similar positions for engagement with the pusher elements on the opposite sides of the rotor. Also, the teeth of my preferred rotor have substantially straight sides disposed angularly with respect to rotor radii. In a reversible structure, such as that disclosed, and in order to provide for similar characteristics of movement in each direction, the tooth angles are equal on the opposite sides of rotor radii extending through the vertices of the respective teeth.

As depicted in Fig. 6, the axes relative to which the rotor driving and locking parts 73 and 74 swing are on opposite sides of the rotor axis with center lines passing through the cam slots between the diverging cam surfaces thereof and mid-way between the guide strips 59 and 60. As also illustrated in Fig. 6, as well as in Figs. 7 and 8, the rotor driving and locking parts 73 and 74 are swingable circumferentially of the rotor through an angle a on each side of the center line through the cam slot, which angle is such that the cam driving elements at the ends thereof move a distance substantially equal to half the width of a tooth on either side of the center line. Thus, the direction of the driving force exerted by each rotor driving element against the side surface of a tooth during its movement inwardly toward the rotor axis is determined by the side of the tooth with which the driving element is engaged.

In order consistently and effectively to determine and select the direction of rotor movement, I have provided biasing elements in the form of leaf springs 85 and 86 which have ends secured to the enlarged end portions 49 and 50 of the levers 47 and 48, so that they project from diametrically opposed sides of the enlarged end portions and normally lie in planes passing through the axis of the rotor and the axes of movement of the rotor driving and locking parts 73 and 74. The springs 85 and 86 extend through slots 87 in bifurcated studs 88, which studs are secured to and project inwardly from the arms 75 and 76 to positions opposed to the studs 79. In each instance, the slots 87 in the bifurcated studs are somewhat wider than the thickness of the leaf springs, so that the studs are slidable with relative freedom along the surfaces of the springs, whereby the springs do not interfere with or materially hamper the normal linear movements of the slide. With this arrangement of structure, the direction of rotation of the rotor may be changed by effecting swinging movement of the lever 47 relative to the shaft 37. Such swinging, as depicted in Figs. 6 and 8, determines the surfaces of the cam slots toward which the respective studs 79 are biased and also determines the side of the tooth which is approached by a rotor driving element during each movement of the slide. With the parts in positions illustrated in Fig. 6, the lever 47 is moved in a clockwise direction through an angle b from the normal center position. This produces a clockwise biasing force of the leaf springs 85 and 86 against the rotor driving and locking parts 73 and 74, whereby the rotor driving elements approach the side surfaces of successive teeth on opposite sides of the rotor, on the sides of those teeth which effect counterclockwise rotor movements. When the lever 47 is swung through an angle c to the opposite side of its center position, the parts assume positions, as depicted in Fig. 8, for producing clockwise rotation of the rotor as a result of linear reciprocating movements of the slide; the rotor being moved a distance dependent upon the width of one half of a tooth during each such linear movement of the slide. As depicted in Figs. 4 and 5, the upper and lower levers 47 and 48 are connected at their projecting ends by a pin 89, so that they move together. A tension spring 90 having one end connected to the pin 89 and its other end anchored to one of the posts 36 biases levers 47 and 48 to a position such that the driving force normally imparted to the rotor produces clockwise rotation thereof. A yoke 92 rotatably secured to the connecting pin 89 has a connection through screw 93 to a movable armature 94 of a solenoid 95; the axis of movement of the solenoid armature 94 being disposed in opposed relationship to the spring 90 and so as to swing the levers to positions for effecting counterclockwise movements of the rotor, and, when the solenoid 95 is energized, the rotor movements are in a clockwise direction.

In Fig. 9, I have depicted the structure of a solenoid adapted to use at the positions of any of the solenoids 55, 56 or 95. In this illustrated structure, adapted to operation on alternating current, an inner sleeve 97 supports a movable armature 98 for linear sliding movement and preferably has in the end portion thereof opposite the armature a laminated magnetic core 99 secured in position as at 100 by soldering or brazing. The sleeve 97 is preferably made of a metal, such as brass, and is split longitudinally of the axis thereof to minimize the losses and heating which would result from eddy currents with a solid ring. End rings 102 and 103, which are also preferably split, serve as end supports for a winding 104, which winding is desirably insulated from the sleeve and end rings by a covering of insulated material 105. The use of the laminated iron core 99 increases the flux density acting upon the armature and provides somewhat the effect of the usual electromagnet action to supplement the normal solenoid action for drawing the armature into the sleeve when the winding is energized.

Figure 3:
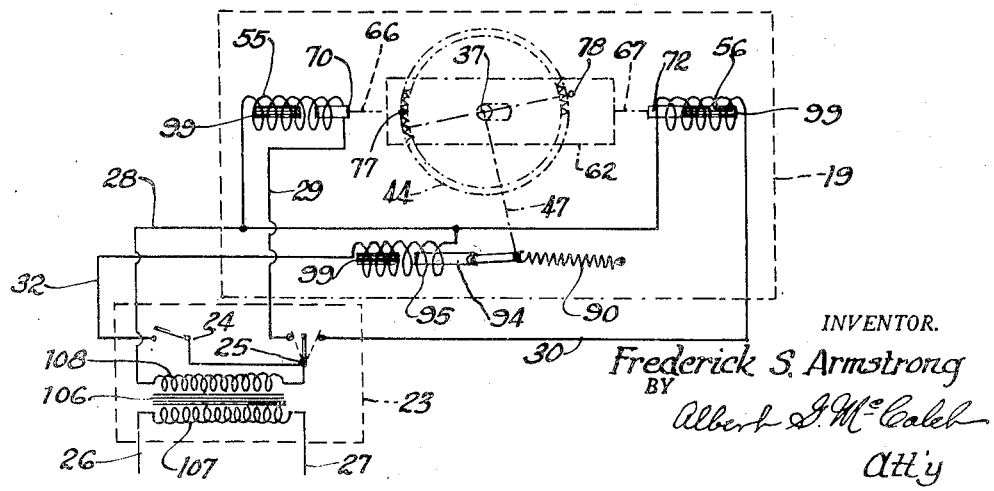
Fig. 3 is a schematic circuit diagram illustrating the electrical connections of parts utilized in the remote directional control apparatus depicted in Fig. 1.

Referring now to the schematic circuit diagram depicted in Fig. 3, the control unit 23 includes a step-down transformer 106 having a primary winding 107 connected to the power supply line leads 26 and 27 and a secondary winding 108 for providing the low voltage utilized for effecting operation of the control unit 19. With the circuit disclosed, actuation of the rotor 44 and shaft 37 of the control unit 19 may be selectively effected in either of the two directions of rotation by operations of the switches 24 and 25 with the four leads 28, 29, 30 and 32 connecting the remotely disposed control units. The switch 24 is a normally open single pole single throw switch connected in series with the lead 32 from one side of the winding of the solenoid 95 to one end of the secondary winding 108; the secondary winding 108 having its other end connected through the lead 28 to one end of each of the windings of the solenoids 55, 56 and 95. The switch 25 is a single pole double throw switch adapted to complete a circuit from the secondary winding to either of the solenoids 55 and 56, depending upon which way the movable switch element is actuated. One stationary contact of the switch 25 is connected through the lead 29 to one end of the winding of the solenoid 55, while the other stationary contact of that switch is connected through the lead 30 to one end of the winding of the solenoid 56. With this disclosed circuit arrangement, continued movement of the rotor in one direction and by increments is effected by manual actuation of the switch 25 alternately between the stationary contacts.

In some instances, as for example, in the control of the position of a directional antenna, as illustrated, only 180 degrees of movement of the actuated driving element are necessary. Furthermore, the limitation of the rotor movements to 180 degrees from selected directions is desirable, so that determined positions of the rotor may be reselected or reestablished by using the limiting positions as stops from which a predetermined number of increments may be counted by the operator. With the disclosed structure, which utilizes the gear-type rotor 44 having peripheral teeth thereon, one or more stops may be provided at desired positions, as illustrated in Figs. 6 and 7, by filling the space between adjacent teeth 46, as at 109, or by omitting the normal cut between such teeth. When substantially 180 degrees of movement is desired, as in the present instance, one such stop is provided on the rotor periphery.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. Remote control apparatus adapted to operation from an electrical power source and comprising, in combination, a driving unit, a control unit, and a plurality of lead wires connecting said units, said driving unit embodying an electrically operated motor having a normally locked rotor element supported for rotational movement, electrically energizable driving elements for effecting movements of the rotor element in sequential increments upon repeated and alternate electrical energization of said driving elements, and an electrically energizable motor reversing element for changing the direction of action of the driving elements upon the rotor, and said control unit including a first manually operable and normally open switch having an element movable to two positions other than the open position for effecting alternate energization of the driving elements, and a second manually operable switch for effecting energization and de-energization of said reversing element.

2. Remote control apparatus as defined in claim 1, and wherein said control unit includes a step-down transformer having a secondary winding connected to said switches and a primary winding for connection to the power source, so that the voltages transmitted through the switches and lead wires to the driving and reversing elements are lower than the voltage of the power source.

3. Remote control apparatus as defined in claim 1, and wherein said rotor element comprises a gear-type member having peripheral teeth thereon, and said electrically energizable driving elements each comprehending an electromagnet and a part movable by said electromagnet into driving engagement with the teeth.

4. Remote control apparatus as defined in claim 1, and wherein said rotor element comprises a gear-type member having peripheral teeth thereon, said electrically energizable driving elements each comprehending an electromagnet and a part movable by said electromagnet into driving engagement with the teeth, and said motor reversing element including an electromagnet and spring for effecting changes of the direction of the action lines of movement of said parts of the driving elements relative to the rotor element.

5. Remote control apparatus as defined in claim 1, and further characterized by stops for limiting the maximum travel of the rotor in either direction to 180 degrees.

6. Remote control apparatus as defined in claim 1, and adapted to the control of the position of a directional antenna, and further characterized by a weather-proof housing enclosing said driving unit.

7. In remote control apparatus adapted to operation from an electrical power source, the combination comprising support plates secured together in separated and opposed relationship and having aligned bearings therein, a gear-type rotor element having peripheral teeth projecting radially therefrom, said rotor being carried by a central shaft journalled in said bearings, means providing parallel guides in opposed and aligned relationship on the support plates and extending transversely of said bearings, each of said support plates also having cam slots therein at positions diametrically opposed with respect to said bearings and near opposite sides of the rotor element, said cam slots in each plate each being symmetrically shaped with reference to a center line which is radial to one of said bearings and parallel to said guides and each having side wall portions converging in a direction toward the bearing, a slide carried by and movable linearly relative to said guides and cam slots, oppositely disposed pairs of substantially parallel arms each supported at one end by said slide and movable therewith, said pairs of arms being swingable laterally of the direction of slide movement and circumferentially of the rotor element about their supported ends and having pusher shafts at their extending ends which pusher shafts extend axially of the rotor adjacent the teeth thereof, said pairs of arms also having studs thereon projecting into the said cam slots, a spring supporting member mounted for rotational movement relative to the central shaft, springs carried by the spring supporting member for biasing the studs against side walls of their respective cam slots, said studs, pusher shafts, cam slots and rotor teeth being so relatively disposed and shaped that back and forth movements of the slide effect alternate engagements of the pusher shafts with the rotor teeth at positions for moving the rotor through an increment.

8. In remote control apparatus as defined in claim 7, the combination being further characterized by solenoids having movable armatures connected to opposite ends of said slide for effecting said back and forth movement thereof.

9. In remote control apparatus as defined in claim 7, the combination being further characterized by means including a solenoid for shifting the position of the spring supporting member relative to the central shaft so as to change the side walls of the cam slots against which the pusher shafts are biased, thereby to effect reversal of the direction of the rotor movement produced by said back and forth movements of the slide.

10. In remote control apparatus as defined in claim 7, said cam slots being substantially pear-shaped, the ends of the cam slots near the central axis being of widths to receive their respective studs with relative snugness, and the ends of the cam slots remote from the central axis being over twice the diameters of the studs.

11. In remote control apparatus adapted to operation from an electrical power source, the combination comprising support means, a gear type rotor element supported for rotation relative to the support means and having an odd number of teeth thereon, said teeth presenting successive surfaces disposed in angular relationship to radii of the rotor element, a part movable linearly relative to the support means in a direction lateral to the axis of rotation of the rotor element, said support having cam means thereon providing cam surfaces symmetrically and oppositely disposed with respect to a line parallel to the direction of linear movement of said part, and a mechanism including elements carried by said part for translating linear movements of said part into circumferential forces against the rotor teeth, said mechanism embodying similar and oppositely disposed portions at positions diametrically related to the rotor and hingedly supported for swinging movements in directions circumferential to the rotor, each of said portions including a stud disposed for engagement with one of said cam surfaces and a tooth engaging element adjacent diametrically opposed rotor teeth, said tooth engaging elements of the two parts being spaced so that one clears the teeth when the other is bottomed between adjacent teeth, spring means for biasing each of the studs into engagement with said one of the cam surfaces, and means for effecting reciprocation of said part so that said tooth engaging elements alternately engage rotor teeth to move the rotor by increments.

12. In remote control apparatus as defined in claim 11, said means for effecting reciprocation of the part comprising solenoids secured to the support means in opposed relationship and having movable armatures connected to said part, and means for separately energizing the solenoids.

13. In remote control apparatus as defined in claim 11, one of said studs being confined by said cam means when the adjacent tooth engaging element is bottomed between rotor teeth, so as to lock the rotor.

14. In remote control apparatus as defined in claim 11, the combination being further characterized by means bridging the space between adjacent teeth on opposed sides of the rotor element to serve as stops for limiting the movements of the rotor element in opposite directions.

FREDERICK S. ARMSTRONG.

REFERENCES CITED

The following references are of record in the file of this patent:

UNITED STATES PATENTS

| Number | Name | Date |
| --- | --- | --- |
| 293,923 | Van Hoevenburgh | Feb. 19, 1884 |
| 740,261 | Fessenden | Sept. 29, 1903 |
| 1,899,151 | Hokanson et al. | Feb. 28, 1933 |

FOREIGN PATENTS

| Number | Country | Date |
| --- | --- | --- |
| 229,754 | Great Britain | Mar. 2, 1925 |
| 355,653 | Great Britain | Aug. 11, 1931 |